No. 714,031. Patented Nov. 18, 1902.
J. REICHERT.
HARNESS REIN GUIDE.
(Application filed Nov. 15, 1901.)
(No Model.)
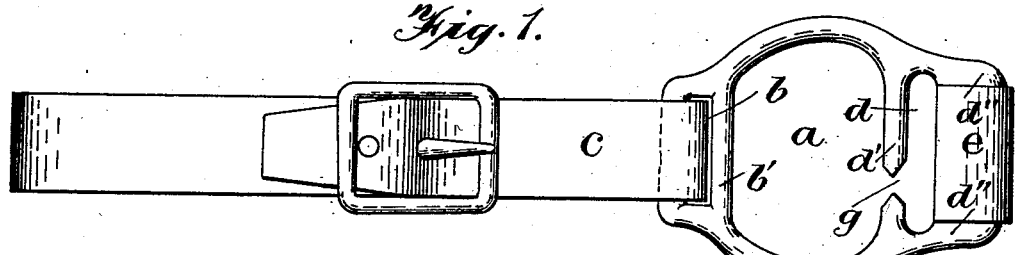
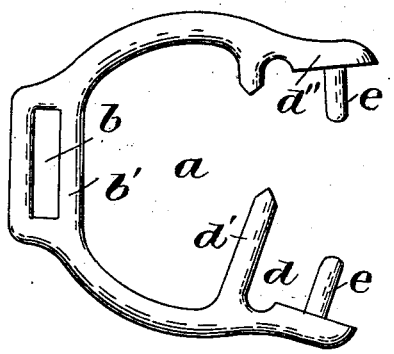
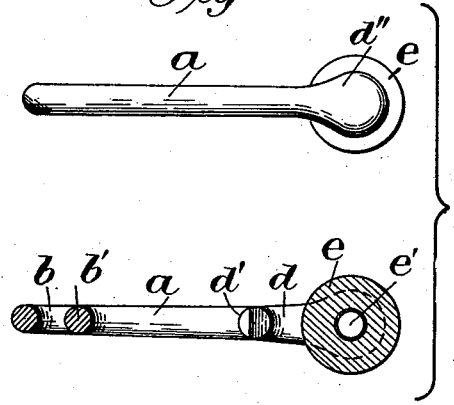
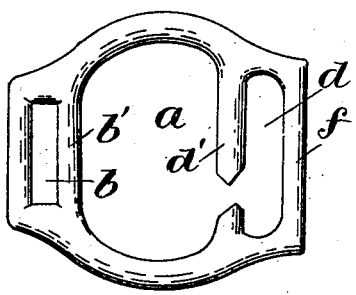
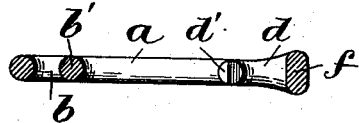
Witnesses
Geo. E. Frech.
Emily R. Peck.
Inventor
John Reichert
By Hubert Peck
Attorney

UNITED STATES PATENT OFFICE.

JOHN REICHERT, OF RACINE, WISCONSIN, ASSIGNOR OF ONE-HALF TO LUCIUS J. ELLIOTT, OF RACINE, WISCONSIN.

HARNESS REIN-GUIDE.

SPECIFICATION forming part of Letters Patent No. 714,031, dated November 18, 1902.

Application filed November 15, 1901. Serial No. 82,444. (No model.)

*To all whom it may concern:*

Be it known that I, JOHN REICHERT, a citizen of the United States, residing at Racine, Racine county, State of Wisconsin, have invented certain new and useful Improvements in Harness Rein-Guides; and I do hereby declare the following to be a full, clear, and exact description of the invention, such as will enable others skilled in the art to which it appertains to make and use the same.

This invention relates to certain improvements in harness attachments, and more particularly to improvements in spreaders or guides for the reins or lines of double harness.

An object of the invention is to provide an exceedingly strong, durable, and yet simple and economical line or rein guide or spreader to which the rein or line can be most easily and quickly applied.

Another object of the invention is to provide an improved rein or line guide or spreader formed in one piece or casting and to which a roller can be applied or not, as desired, and into which the line or rein can be easily and quickly inserted without adjusting parts of the guide and without removing or unbuckling the supporting or hanger strap or connection.

With these and other objects in view my invention consists in certain novel features in construction and in combinations or arrangements of parts, as more fully and particularly described and set forth hereinafter.

Referring to the accompanying drawings, which illustrate constructions within the spirit and scope of my invention as examples for the purpose of explanation, Figure 1 is an elevation of the guide or spreader, showing the hanger or supporting strap attached thereto. Fig. 2 is a side elevation of the spreader of Fig. 1, showing the same expanded to receive the roller. Fig. 3 shows a top plan view and also a horizontal sectional view of the spreader of Fig. 1. Fig. 4 is a side elevation of the device without the guide-roller, but formed instead with a rigid outer guide bar or wall. Fig. 5 is a horizontal section of the device shown in Fig. 4.

The device of my invention is particularly adapted for use with double harness to maintain the lines or reins straight—that is, to hold them in the proper position and against twisting and what might be termed "kinking." When used with double harness, a pair of my devices is employed, and each device is carried by a strap or other suitable hanger or support usually attached to a hame, or the hangers can be attached to any other suitable part of the harness of the two draft-animals.

My device consists of a flat body or frame, preferably cast or otherwise formed in a single piece of metal or other suitable material, to which can be added, if desired, a guide-roller, although as at present advised I do not wish to so limit my invention. The metal frame or body forms the central or intermediate large open ring or eye $a$, at one end or side usually formed with the small or narrow transverse eye or opening $b$, closed from communication with said intermediate opening by the unbroken or rigid cross-bar $b'$. This narrow eye $b$ is preferably provided to receive the hanger or supporting strap $c$ or other suitable support or connection which carries the metal frame or body and supports the same from a hame or other suitable part of the harness. At the opposite end of the body or frame, preferably, I provide the narrow transverse rein-guide opening $d$, formed of the necessary length to receive the flat wide rein or line and of such width as will permit free sliding movement of the rein or line through the opening, yet so that the parallel side walls of the opening will hold the rein against twisting. The guide-opening $d$ is preferably arranged parallel with the hanger-strap eye $b$, although as at present advised I do not wish to so limit my invention.

The cross-bar $d'$, between the side bars of the frame, forms the outer wall of the large intermediate eye or opening $a$ and also forms the inner side wall of the rein or guide opening $d$. The side walls of the frame or body are extended outwardly (see $d''$ $d''$) beyond the cross-bar $d'$ to form the end walls of rein-opening $d$ and to receive or connect the guide or cross bar forming the outer side wall of the rein-opening. In Fig. 1 I show the outer wall of the rein-opening formed by roller $e$, arranged to revolve on an axis parallel with bar $d'$, with the ends of the roller abutting against the frame side ends $d''$ $d''$. The roller is mounted on the short pintles or journals $e'$ $e'$, projecting from and integral with the frame ends $d''$ $d''$ and entering the bore of the roller. Usually the frame or body is cast with the frame ends spread such a distance apart that the roller can be slipped between the inner ends of the two journals $e'$ $e'$. The frame ends are then bent or forced toward each other until the journals extend the desired distance into the roller-bore. If desired, the frame need not be cast with the pintles or journals $e'$, but the ends $d''$ can be cast with perforations to receive a pivot-pin on which the roller can be mounted. Also, if desired, the roller can be dispensed with and the outer side wall of the rein opening or eye $d$ be formed by straight cross-bar $f$, (see Figs. 4 and 5,) cast integral with the ends $d''$ $d''$ and rounded at its inner surface so that the rein can easily slide back and forth over the same. If desired, a sheet-metal roller can be bent loosely around the bar $f$; but as at present advised I do not deem the sheet-metal roller really necessary in the form shown in Figs. 4 and 5. The intermediate cross-bar $d'$ is split or divided near one end or formed with an inclined narrow intermediate passage $g$ therethrough from the large opening or eye $a$ into the rein-opening $d$. This opening $g$ through said cross-bar is narrow, but sufficiently wide to permit the edgewise passage therethrough of the rein or line, yet the arrangement is such that when the rein or line has been properly located in the rein-opening it cannot accidently slip back through said passage $g$ or become caught or hung therein.

The rein can be easily applied to the guide or spreader by merely threading the rein through the large opening $a$, which is preferably large enough to permit passage of the buckle or snap, &c., on the rein end, and then twisting the rein so that one longitudinal edge will enter the passage $g$, and then passing the rein edgewise through said passage and straightening the same out in the rein-opening $d$, with the side guides or walls of said openings arranged transversely of the flat faces of the rein or line, and thereby holding the same properly against turning. The rein can be as easily removed from the guide or spreader and without disturbing or adjusting the hanger-strap.

It is obvious that the device can be modified and changed without departing from the invention. Hence I do not wish to limit myself strictly to the showing.

Having thus fully described the invention, what I claim is—

1. The rein-spreader comprising the frame formed in one piece and having the central opening and the hanger-strap eye at one end of the frame, the sides of the frame extending from said eye to form the side walls of said central opening and at their outer extremities having the pintles projecting toward each other, the transverse bar between said frame sides and forming the outer end wall of said central opening, said bar transversely divided to form a narrow rein-passage, and the roller parallel with and at a distance from said bar and mounted on said pintles, whereby the roller can be inserted between said pintles when said frame sides are spread and confined on the pintles by bending said frame sides toward each other, substantially as described.

2. In a rein-spreader, a frame formed to receive the hanger-strap and having a large central opening and the narrow rein-guide opening having straight parallel inner and outer side walls, the inner side wall formed by a straight transverse frame-bar separating the central opening from the guide-opening, said bar at a point intermediate its length divided transversely by a narrow passage from the central opening to and intermediate the length of the guide-opening, substantially as described.

3. In a rein-spreader, the frame at one end having the hanger-strap eye and at the opposite end having the narrow transverse rein-guide opening, and between said eye and opening having the large central opening, the frame sides forming the end walls of the guide-opening, a roller between the frame sides and forming the outer side wall of the guide-opening, and the straight transverse bar between the frame sides and forming the inner side wall of the guide-opening and the outer side wall of the central opening, said bar at a point intermediate its length divided by a transverse narrow opening for the edgewise passage of the rein between the guide and central openings, substantially as described.

In testimony whereof I affix my signature in presence of two witnesses.

JOHN REICHERT.

Witnesses:
 ALNIENE SCHLEGEL,
 L. SCHLEGEL.